US009052068B2

United States Patent
Wang et al.

(10) Patent No.: US 9,052,068 B2
(45) Date of Patent: Jun. 9, 2015

(54) DUAL-USE LIGHT FIXTURE HAVING AC AND DC LEDS

(71) Applicant: Lextar Electronics Corporation, Hsinchu (TW)

(72) Inventors: Shin-Guo Wang, Taipei (TW); Yung-Long Jian, New Taipei (TW); Feng-Ling Lin, Pingtung (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 100 days.

(21) Appl. No.: 14/049,227

(22) Filed: Oct. 9, 2013

(65) Prior Publication Data

US 2014/0286015 A1    Sep. 25, 2014

(30) Foreign Application Priority Data

Mar. 20, 2013    (TW) .............................. 102109884 A (51) Int. Cl.
*F21V 23/00*    (2006.01)
*F21K 99/00*    (2010.01)
*F21V 29/00*    (2006.01)
*F21Y 101/02*    (2006.01)

(52) U.S. Cl.
CPC ............... *F21K 9/135* (2013.01); *F21V 29/004* (2013.01); *F21Y 2101/02* (2013.01)

(58) Field of Classification Search
CPC ............. F21K 9/10; F21K 9/17; F21K 9/135; F21Y 2101/02; F21V 29/004

USPC ...................................... 362/249.02, 294, 231
See application file for complete search history.

(56) References Cited

U.S. PATENT DOCUMENTS

| 2014/0056001 A1* | 2/2014 | Hsu et al. ................. 362/249.02 |
| 2014/0240984 A1* | 8/2014 | Aliberti ..................... 362/249.02 |
| 2014/0268697 A1* | 9/2014 | Smith et al. .................... 362/183 |

FOREIGN PATENT DOCUMENTS

| TW | M396913 | 1/2011 |
| TW | M399265 | 3/2011 |

* cited by examiner

*Primary Examiner* — Peggy Neils
(74) *Attorney, Agent, or Firm* — CKC & Partners Co., Ltd.

(57) ABSTRACT

A dual-use light fixture having AC and DC LEDs includes a heat-dissipating housing, a printed circuit board located on a first end of the heat-dissipating housing, AC and DC LED chips located on the printed circuit board, and a power supply pedestal coupled to a second end of the heat-dissipating housing. The power supply pedestal includes an AC plug, a DC driving unit, and a thread connector. The AC plug is electrically connected to the printed circuit board for inserting into an AC outlet to provide an AC power. The DC driving unit is located in an accommodating space formed by the power supply pedestal and the heat-dissipating housing and is electrically connected to the printed circuit board. The thread connector is coupled to another AC power, and the AC power is converted into a DC power by the DC driving unit.

13 Claims, 6 Drawing Sheets

DUAL-USE LIGHT FIXTURE HAVING AC AND DC LEDS

RELATED APPLICATIONS

This application claims priority to Taiwan Application Serial Number 102109884, filed Mar. 20, 2013, which is herein incorporated by reference.

BACKGROUND

1. Technical Field The present disclosure relates to a dual-use light fixture having AC and DC LEDs.

2. Description of Related Art

In daily life, lighting devices are indispensable tools. Conventional lighting devices use light bulbs or lamps as the light sources. Fluorescent tubes, incandescent bulbs, and halogen light bulbs are most frequently used among these light bulbs or lamps. Since traditional incandescent bulbs consume a lot of electrical energy when emitting light, LED lighting devices including light-emitting diodes (LED) as light sources have become more and more popular in recent years. Compared with incandescent bulbs, LED lighting devices are associated with the advantages of long lifespan, low energy consumption, good shock resistance, and high brightness.

Some LED lighting devices use DC (direct current) LED chips, while others use AC (alternating current) LED chips. LED lighting devices having DC LED chips use connectors with threads (e.g., E11, E17, or E27 connectors) to connect to power sockets corresponding to such connectors. LED lighting devices having AC LED chips use connectors with two pins to electrically connect to general power outlets on walls.

As a result, in order to allow for application to different electrical connections, customers often need to buy both LED lighting devices having DC LED chips and LED lighting devices having AC LED chips.

SUMMARY

An aspect of the present invention is to provide a dual-use light fixture having AC and DC LEDs.

According to an embodiment of the present invention, a dual-use light fixture having AC and DC LEDs includes a heat-dissipating housing, a printed circuit board at least one DC LED chip, at least one AC LED chip, and a power supply pedestal. The heat-dissipating housing has a first end and a second end. The first end has a first opening and the second end has a second opening, and a diameter of the first opening is greater than a diameter of the second opening. The printed circuit board is located on the first end of the heat-dissipating housing. The DC LED chip is disposed on the printed circuit board. The AC LED chip is disposed on the printed circuit board. The power supply pedestal is coupled to the second end of the heat-dissipating housing. An accommodating space is formed by the power supply pedestal and the heat-dissipating housing. The power supply pedestal includes an AC plug, a DC driving unit, and a thread connector. The AC plug is electrically connected to the printed circuit board for inserting into an AC outlet to provide an AC power, and the AC power drives the AC LED chip to emit light. The DC driving unit is located in the accommodating space and is electrically connected to the printed circuit board. The thread connector is coupled to another AC power, and the AC power is converted into a DC power by the DC driving unit for driving the DC LED chip to emit light.

In an embodiment of the present invention, the power supply pedestal further includes a hollow body, a power connection portion, and an engaging portion. The hollow body is disposed in the second end of the heat-dissipating housing, The accommodating space is formed by the hollow body and the heat-dissipating housing. The power connection portion is connected to an outside of the hollow body. The AC plug is disposed on the outside surface of the power connection portion. An end of the engaging portion is connected to the hollow body, and another end of the engaging portion is connected to the thread connector.

In an embodiment of the present invention, the outer surface of the hollow body has a first groove, and the inner surface of heat-dissipating housing has a first protruding rib coupled to the first groove.

In an embodiment of the present invention, the inner surface of the hollow body has a second groove, and the DC driving unit has a second protruding rib coupled to the second groove.

In an embodiment of the present invention, the outer surface of the hollow body has at least one protruding fastener for interfering with the inner surface of heat-dissipating housing.

In an embodiment of the present invention, the power connection portion has two channels. Connection pins of the AC plug selectively protrude from the two channels or are accommodated in the accommodating space through the two channels.

In an embodiment of the present invention, the light fixture further includes a tenon. The tenon is disposed on the inner surface of the power connection portion. When the connection pins of the AC plug protrude from the two channels of the power connection portion, the AC plug is positioned by the tenon.

In an embodiment of the present invention, the outer surface of the engaging portion has a first thread, and the inner surface of the thread connector has a second thread engaged with the first thread.

In an embodiment of the present invention, a light emitted from the AC LED chip and a light emitted from the DC LED chip have different color temperature.

In an embodiment of the present invention, a lengthwise direction of connection pins of the AC plug is perpendicular to a lengthwise direction of the thread connector.

In an embodiment of the present invention, the light fixture further includes a lampshade. The lampshade is positioned on the first end of the heat-dissipating housing and covers the AC and DC LED chips.

In an embodiment of the present invention, the number of the DC LED chips is two or greater, and the DC LED chips are arranged circularly on the printed circuit board.

In an embodiment of the present invention, the number of the AC LED chips is two or greater, and the AC LED chips are arranged circularly on the printed circuit board.

In the aforementioned embodiments of the present invention, since the DC and AC LED chips are located on the printed circuit board, and the power supply pedestal includes the AC plug, the DC driving unit, and the thread connector, when the AC plug is inserted into an AC outlet, the AC plug can provide an AC power to the AC LED chip, such that the AC LED chip emits light. Moreover, when the thread connector is coupled to another AC power, the AC power can be converted into a DC power by the DC driving unit, such that the DC LED chip emits light.

That is to say, the DC and AC LED chips of the light fixture can be selectively used by electrically connecting to different types of power supplies. Even if either the DC LED chip or AC LED chip is broken, the functioning DC LED chip or AC LED chip can continue to be used. As a result, the lifespan of the light fixture can be increased. Furthermore, since the light fixture has both the DC and AC LED chips, the light fixture can be coupled to either a power socket with a thread or a power outlet on a wall. Users do not need to buy two different types of LED light fixtures with different connectors, so that cost savings are realized for the consumer.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
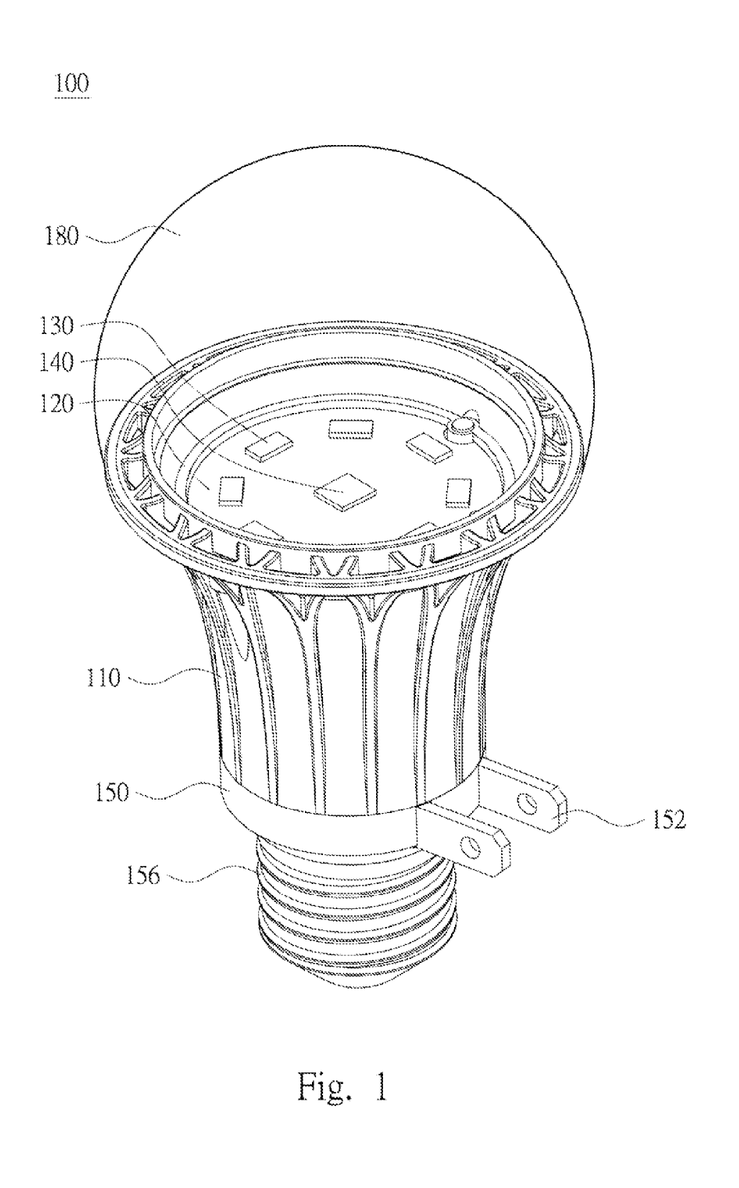
FIG. 1 is a perspective view of a dual-use light fixture having AC and DC LEDs according to an embodiment of the present invention.
Figure 2:
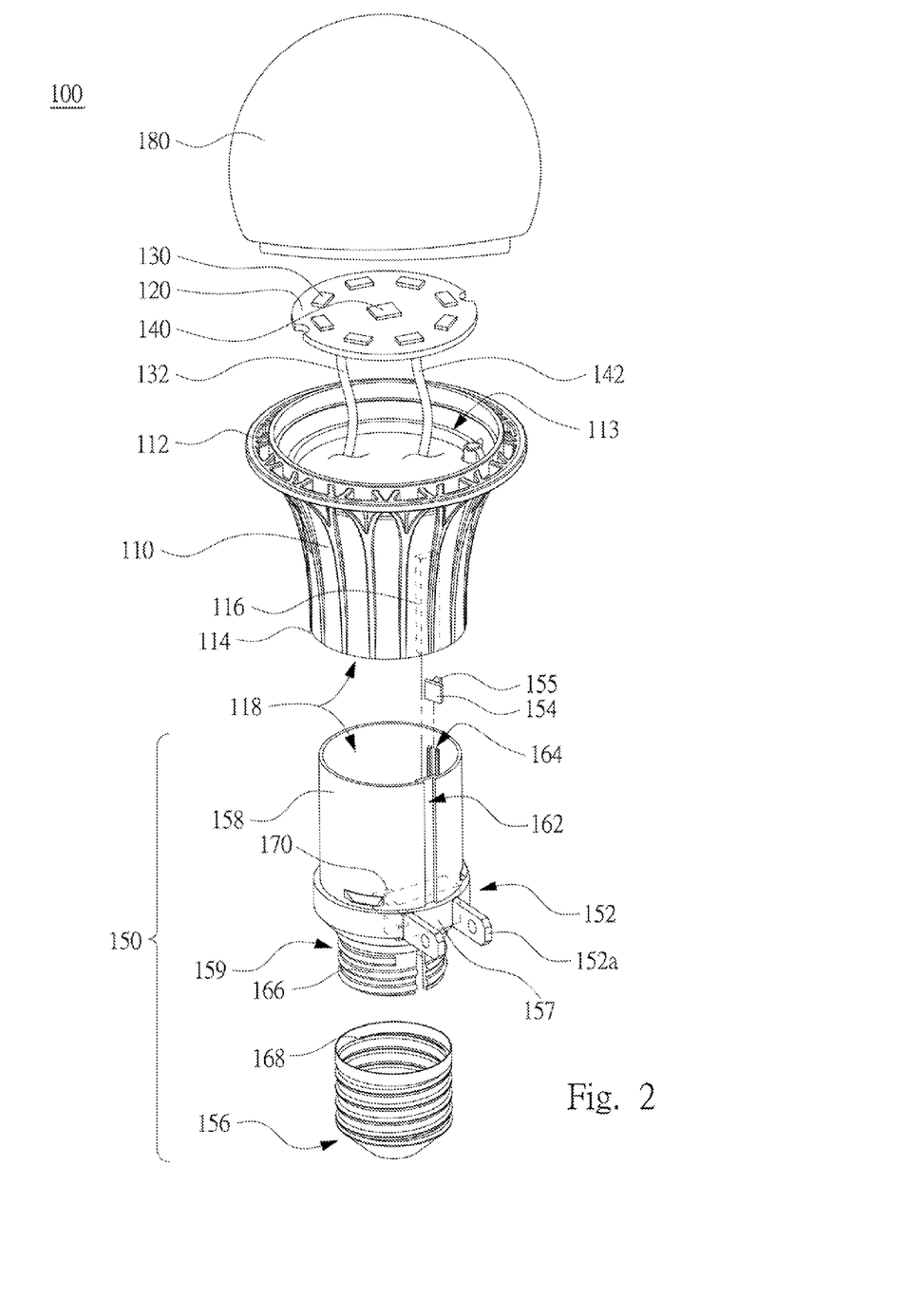
FIG. 2 is an exploded view of the light fixture shown in FIG. 1.

FIG. 1 is a perspective view of a dual-use light fixture 100 having AC and DC LEDs according to an embodiment of the present invention. FIG. 2 is an exploded view of the light fixture 100 shown in FIG. 1. As shown in FIG. 1 and FIG. 2, the light fixture 100 includes a heat-dissipating housing 110, a printed circuit board 120, a plurality of DC LED chips 130, an AC LED chip 140, and a power supply pedestal 150. The DC LED chips 130 and the AC chip 140 are mounted on the printed circuit board 120. An accommodating space 118 is formed by the power supply pedestal 150 and the heat-dissipating housing 110. The power supply pedestal 150 includes an AC plug 152, a DC driving unit 154, and a thread connector 156. The AC plug 152 is electrically connected to the printed circuit board 120. The DC driving unit 154 is located in the accommodating space 118 and is electrically connected to the printed circuit board 120. In this embodiment, the heat-dissipating housing 110 is substantially hollow barrel shaped.

In use, two connection pins 152a of the AC plug 152 can insert into a power outlet (e.g., an AC outlet on a wall) to provide an AC power to the AC LED chip 140 through a conductive wire harness 142 (i.e., an assembly including a plurality of conductive wires) electrically connected to the AC plug 152, such that the AC power drives the AC LED chip 140 to emit light. Moreover, the thread connector 156 can be coupled to another AC power (e.g., a power socket with a thread), and the AC power can be converted into a DC power by the DC driving unit 154 electrically connected to the thread connector 156. Thereafter, the DC driving unit 154 can provide DC power by a conductive wire harness 132 electrically connected to the DC driving unit 154 to drive the DC LED chips 130 to emit light. The thread connector 156 may be an E11, E17, E26, or E27 copper connector, but the present invention is not limited in this regard.

In this embodiment, the light emitted from the AC LED chip 140 and the light emitted from the DC LED chips 130 have different color temperatures, such that the usability of the light fixture 100 can be increased. For example, when the color temperature of the AC LED chip 140 is lower than the color temperature of the DC LED chips 130 the AC LED chip 140 may be used as a nightlight for utilization when sleeping, and the DC LED chips 130 may be used as a desk lamp for reading. In addition, the lengthwise direction of the connection pins 152a of the AC plug 152 is perpendicular to the lengthwise direction of the thread connector 156. As a result of such a design, users can conveniently use either the AC plug 152 or the thread connector 156.

Furthermore, the light fixture 100 may further include a light-transmissive lampshade 180. The lampshade 180 can cover the DC and AC LED chips 130, 140, such that the DC and AC LED chips 130, 140 can be protected from moisture and dust by the lampshade 180.

In the following description, detailed structures of the heat-dissipating housing 110 and the power supply pedestal 150 will be described.

Figure 3:
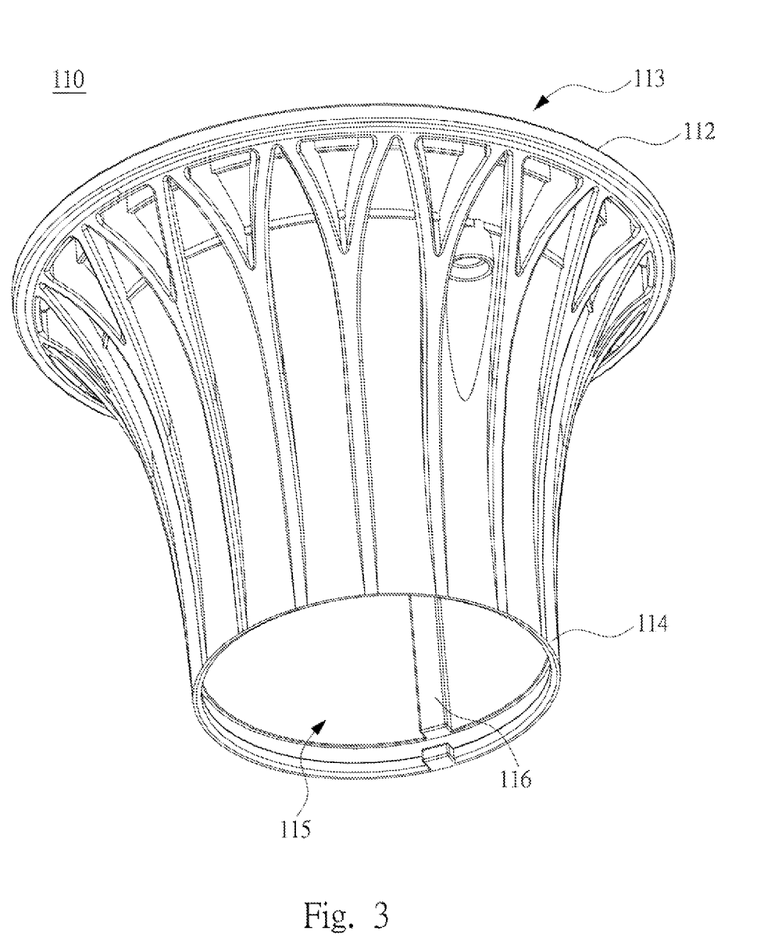
FIG. 3 is a perspective view of a heat-dissipating housing shown in FIG. 1.

FIG. 3 is a perspective view of the heat-dissipating housing 110 shown in FIG. 1. As shown in FIG. 2 and FIG. 3, the heat-dissipating housing 110 has a first end 112 and a second end 114. The first end 112 has a first opening 113, and the second end 114 has a second opening 115. In this embodiment, the diameter of the first opening 113 is greater than the diameter of the second opening 115. The printed circuit board 120 and the lampshade 180 are positioned on the first end 112 of the heat-dissipating housing 110. The power supply pedestal 150 is coupled to the second end 114 of the heat-dissipating housing 110. The heat-dissipating housing 110 may be made of a material that includes copper, other conductive metals, ceramic, or heat-dissipating plastic, but the present invention is not limited in this regard.

Figure 4:
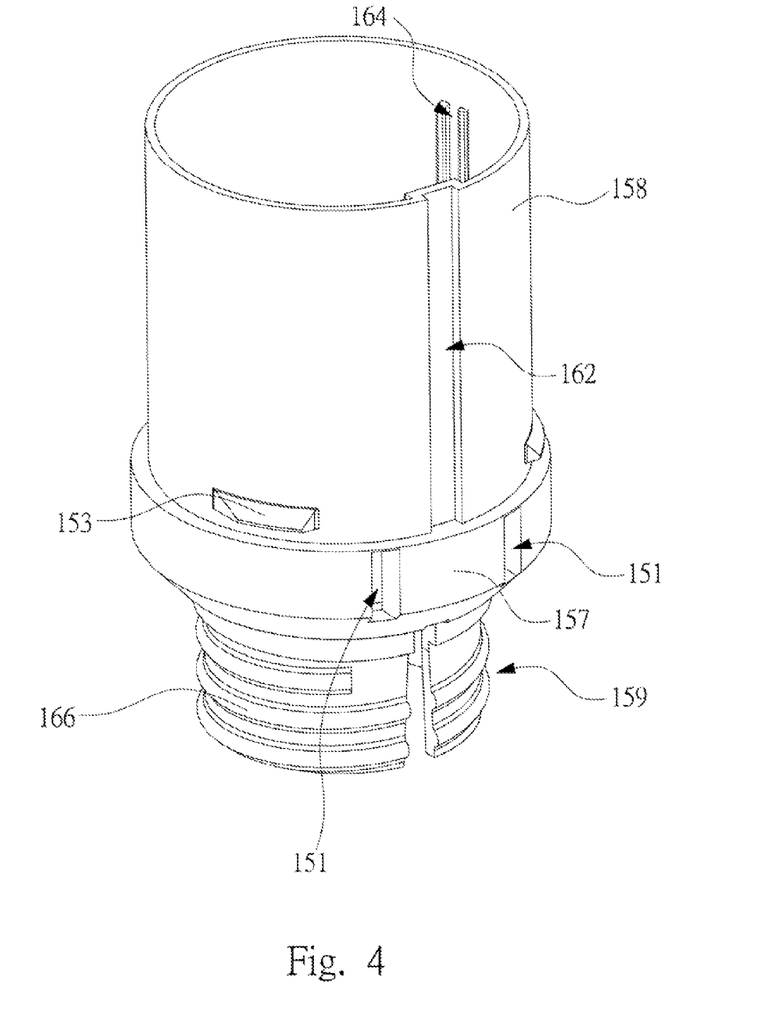
FIG. 4 is a partial perspective view of a power supply pedestal shown in FIG. 2.

FIG. 4 is a partial perspective view of the power supply pedestal 150 shown in FIG. 2. As shown in FIG. 2 and FIG. 4, the power supply pedestal 150 may further include a hollow body 158, a power connection portion 157, and an engaging portion 159. The hollow body 158 is disposed in the heat-dissipating housing 110 through the second end 114. The accommodating space 118 is formed by the hollow body 158 and the heat-dissipating housing 110. In this embodiment, the outer surface of the hollow body 158 has a first groove 162. With further reference to FIG. 3, the inner surface of heat-dissipating housing 110 has a first protruding rib 116, and the first protruding rib 116 of the heat-dissipating housing 110 can be coupled to the first groove 162 of the hollow body 158, such that the heat-dissipating housing 110 can be assembled to or separated from the hollow body 158. Moreover, the outer surface of the hollow body 158 may further have a protruding fastener 153. The protruding fastener 153 can interfere with the inner surface of heat-dissipating housing 110.

As shown in FIG. 2 and FIG. 4, the inner surface of the hollow body 158 has a second groove 164. The DC driving unit 154 has a second protruding rib 155, and the second protruding rib 155 can be coupled to the second groove 164, such the that the DC driving unit 154 can be assembled to or separated from the hollow body 158.

Furthermore, an end of the engaging portion 159 is connected to the hollow body 158, and another end of the engaging portion 159 is connected to the thread connector 156. The outer surface of the engaging portion 159 has a first thread 166, and the inner surface of the thread connector 156 has a second thread 168 engaged with the first thread 166, such that the engaging portion 159 can be assembled to or separated from the thread connector 156.

The power connection portion 157 is connected to the outside of the hollow body 158, and the AC plug 152 is disposed on the outside surface of the power connection portion 157. The power connection portion 157 has two channels 151 (see FIG. 4), and the connection pins 152a (see FIG. 2) of the AC plug 152 selectively protrude from the two channels 151 or are accommodated in the accommodating space 118 through the two channels 151. In this embodiment, the light fixture 100 may further include a tenon 170. The tenon 170 is disposed on the inner surface of the power connection portion 157. When the connection pins 152a are used to insert into a power outlet (e.g., an AC outlet on a wall), the AC plug 152 can be positioned by the tenon 170, such that the connection pins 152a protrude from the two channels 151 of the power connection portion 157. That is to say, the tenon 170 can prevent the AC plug 152 from drawing back into the accommodating space 118 when inserting into a power outlet.

In addition, when the thread connector 156 is coupled to another type of power outlet (e.g., a power socket with a thread), the connection pins 152a of the AC plug 152 can be drawn back and accommodated in the accommodating space 118, such that the connection pins 152a of the AC plug 152 do not interfere with a power socket with a thread.

Since the DC and AC LED chips 130, 140 are located on the printed circuit board 120, and the power supply pedestal 150 includes the AC plug 152, the DC driving unit 154, and the thread connector 156, when the AC plug 152 is inserted into an AC outlet, the AC plug 152 can provide an AC power to the AC LED chip 140 such that the AC LED chip 140 emits light. Moreover, when the thread connector 156 is coupled to another AC power, the AC power can be converted into a DC power by the DC driving unit 154, such that the DC LED chips 130 emit light.

That is to say, the DC and AC LED chips 130, 140 of the light fixture 100 can be selectively used by electrically connecting to different types of power supplies. Even if one kind of the DC LED chips 130 or AC LED chip 140 are broken, the other kind of the functioning DC LED chips 130 or AC LED chip 140 can still continue to be used. As a result, the lifespan of the light fixture 100 can be increased. Furthermore, since the light fixture 100 has both the DC and AC LED chips 130, 140, the light fixture 100 can be coupled to either a power socket with a thread or a power outlet on a wall. Users do not need to buy two different types of LED light fixtures with different connectors, so that cost savings are realized for the consumer.

It is to be noted that the connection relationships of the elements described above will not be repeated in the following description, and only aspects related to the different design arrangements of the DC and AC LED chips 130, 140 will be explained.

Figure 5:
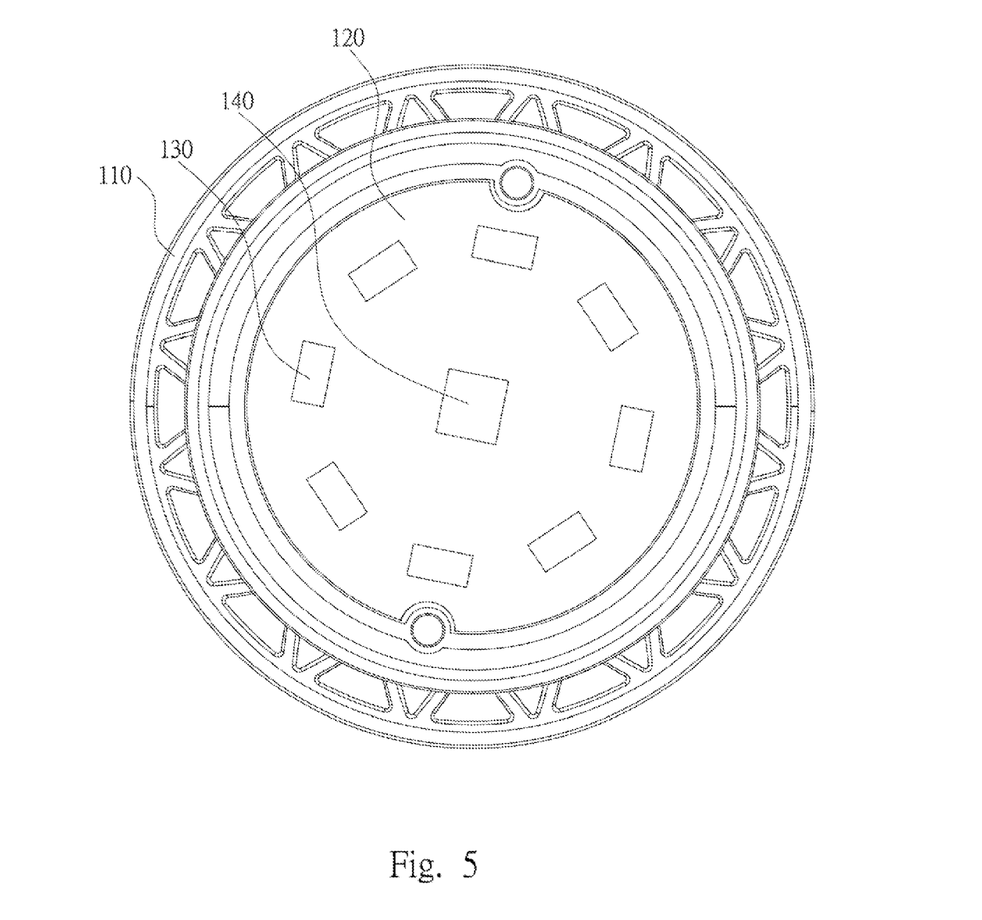
FIG. 5 is a top view of the light fixture shown on FIG. 1 after a lampshade is removed.

FIG. 5 is a top view of the light fixture 100 shown on FIG. 1 after the lampshade 180 is removed. In this embodiment, the number of the DC LED chips 130 is two or greater, and the DC LED chips 130 are arranged circularly on the printed circuit board 120. The number of the AC LED chips 140 is one, and the AC LED chip 140 is surrounded by the DC LED chips 130. Moreover, the shape of each of the DC LED chips 130 is rectangular, and the shape of the AC LED chip 140 is square, but the present invention is not limited in this regard.

Figure 6:
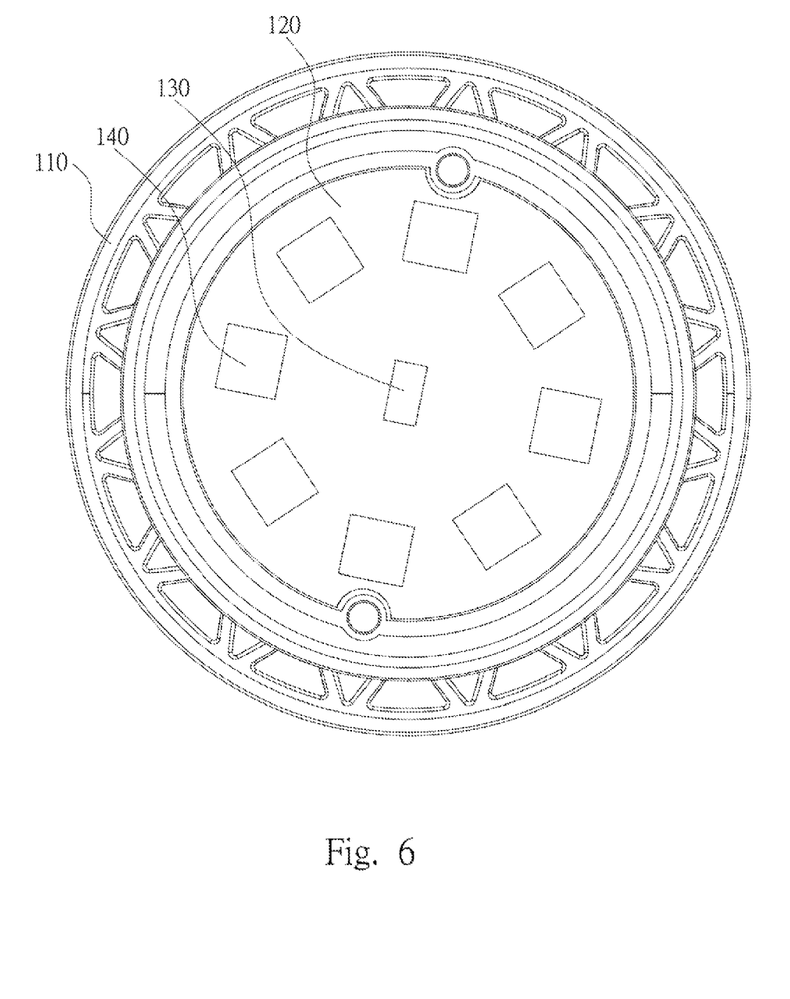
FIG. 6 is another embodiment of AC and DC LED chips arranged on a printed circuit board shown in FIG. 5.

FIG. 6 is another embodiment of the AC and DC LED chips 130, 140 arranged on the printed circuit board 120 shown in FIG. 5. The difference between this embodiment and the embodiment shown in FIG. 5 is that the number of the AC LED chips 140 is two or greater, and the AC LED chips 140 are arranged circularly on the printed circuit board 120. The number of the DC LED chips 130 is one, and the DC LED chip 130 is surrounded by the AC LED chips 140.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A dual-use light fixture having AC and DC LEDs comprising:
    a heat-dissipating housing having a first end and a second end, wherein the first end has a first opening and the second end has a second opening, and a diameter of the first opening is greater than a diameter of the second opening;
    a printed circuit board located on the first end of the heat-dissipating housing;
    at least one DC LED chip disposed on the printed circuit board;
    at least one AC LED chip disposed on the printed circuit board; and
    a power supply pedestal coupled to the second end of the heat-dissipating housing, wherein an accommodating space is formed by the power supply pedestal and the heat-dissipating housing, and the power supply pedestal comprises:
        an AC plug electrically connected to the printed circuit board for inserting into an AC outlet to provide an AC power, wherein the AC power drives the AC LED chip to emit light;
        a DC driving unit located in the accommodating space and electrically connected to the printed circuit board; and
        a thread connector coupled to another AC power, wherein another AC power is converted into a DC power by the DC driving unit for driving the DC LED chip to emit light.

2. The light fixture of claim 1, wherein the power supply pedestal further comprises:
    a hollow body disposed in the second end of the heat-dissipating housing, wherein the accommodating space is formed by the hollow body and the heat-dissipating housing;
    a power connection portion connected to an outside of the hollow body, wherein the AC plug is disposed on an outside surface of the power connection portion; and
    an engaging portion, wherein an end of the engaging portion is connected to the hollow body, and another end of the engaging portion is connected to the thread connector.

3. The light fixture of claim 2, wherein an outer surface of the hollow body has a first groove, and an inner surface of heat-dissipating housing has a first protruding rib coupled to the first groove.

4. The light fixture of claim 2, wherein an inner surface of the hollow body has a second groove, and the DC driving unit has a second protruding rib coupled to the second groove.

5. The light fixture of claim 2, wherein an outer surface of the hollow body has at least one protruding fastener for interfering with an inner surface of heat-dissipating housing.

6. The light fixture of claim 2, wherein the power connection portion has two channels, and connection pins of the AC plug selectively protrude from the two channels or are accommodated in the accommodating space through the two channels.

7. The light fixture of claim 6, further comprising:
a tenon disposed on an inner surface of the power connection portion, wherein when the connection pins of the AC plug protrude from the two channels of the power connection portion, the AC plug is positioned by the tenon.

8. The light fixture of claim 2, wherein an outer surface of the engaging portion has a first thread, and an inner surface of the thread connector has a second thread engaged with the first thread.

9. The light fixture of claim 1, wherein a light emitted from the AC LED chip and a light emitted from the DC LED chip have different color temperatures.

10. The light fixture of claim 1, wherein a lengthwise direction of connection pins of the AC plug is perpendicular to a lengthwise direction of the thread connector.

11. The light fixture of claim 1, further comprising:
a lampshade positioned on the first end of the heat-dissipating housing and covering the AC and DC LED chips.

12. The light fixture of claim 1, wherein the number of the DC LED chips is two or greater, and the DC LED chips are arranged circularly on the printed circuit board.

13. The light fixture of claim 1, wherein the number of the AC LED chips is two or greater, and the AC LED chips are arranged circularly on the printed circuit board.

* * * * *